US010664790B2

(12) United States Patent
Bolton

(10) Patent No.: US 10,664,790 B2
(45) Date of Patent: *May 26, 2020

(54) SYSTEMS, METHODS, AND COMPUTER PROGRAM PRODUCTS FOR PROCESSING A PACKAGE FOR SHIPPING WITH A COMMON CARRIER ON A WIRELESS COMPUTING DEVICE

(71) Applicant: United Parcel Service of America, Inc., Atlanta, GA (US)

(72) Inventor: Christopher J. Bolton, Woodstock, GA (US)

(73) Assignee: UNITED PARCEL SERVICE OF AMERICA, INC., Atlanta, GA (US)

( * ) Notice: Subject to any disclaimer, the term of this patent is extended or adjusted under 35 U.S.C. 154(b) by 366 days.

This patent is subject to a terminal disclaimer.

(21) Appl. No.: 15/592,294

(22) Filed: May 11, 2017

(65) Prior Publication Data

US 2017/0243160 A1  Aug. 24, 2017

Related U.S. Application Data

(63) Continuation of application No. 13/274,461, filed on Oct. 17, 2011, now Pat. No. 9,679,268.

(51) Int. Cl.
*G06Q 10/08* (2012.01)
(52) U.S. Cl.
CPC ......... *G06Q 10/0833* (2013.01); *G06Q 10/08* (2013.01)
(58) Field of Classification Search
CPC ......... G06K 9/00442; G06K 19/06037; G06K 19/06046; G06K 2019/06253;
(Continued)

(56) References Cited

U.S. PATENT DOCUMENTS 5,880,451 A  3/1999 Smith et al.
6,246,778 B1  6/2001 Moore
(Continued)

FOREIGN PATENT DOCUMENTS

CN  101014152 A  8/2007

OTHER PUBLICATIONS

Chahal et al., Global order status process of hi-tech companies, 2003 [retrieved Dec. 3, 2019], Journal of Transportation Management, vol. 14, No. 1, 14 total pages. Retrieved: https://digitalcommons.wayne.edu/jotm/vol14/iss1/3/ (Year: 2003).*

(Continued)

*Primary Examiner* — Andrew M Moyer
*Assistant Examiner* — Dennis Rosario
(74) *Attorney, Agent, or Firm* — Shook, Hardy & Bacon L.L.P.

(57) ABSTRACT

Various embodiments of present invention provide systems, methods, and computer-program products containing executable code for processing a package for shipping with a common carrier. Various embodiments include a wireless computing device that may be one of several types of devices such as smartphones, mobile telephones, mobile computers, portable digital assistants, laptop computers, gaming devices, electronic tablets, or other types of similar devices. In particular embodiments, executable code is installed on the wireless computing device that, when executed, causes the device to perform certain functionality. For instance, in particular embodiments, the wireless computing device records an image of a shipping form being placed on a package, verifies the image is suitable for analysis and transmission, and extracts a tracking number from the image. Further, the wireless computing device transmits the image to a common carrier so that the carrier (Continued)

Figure 1:
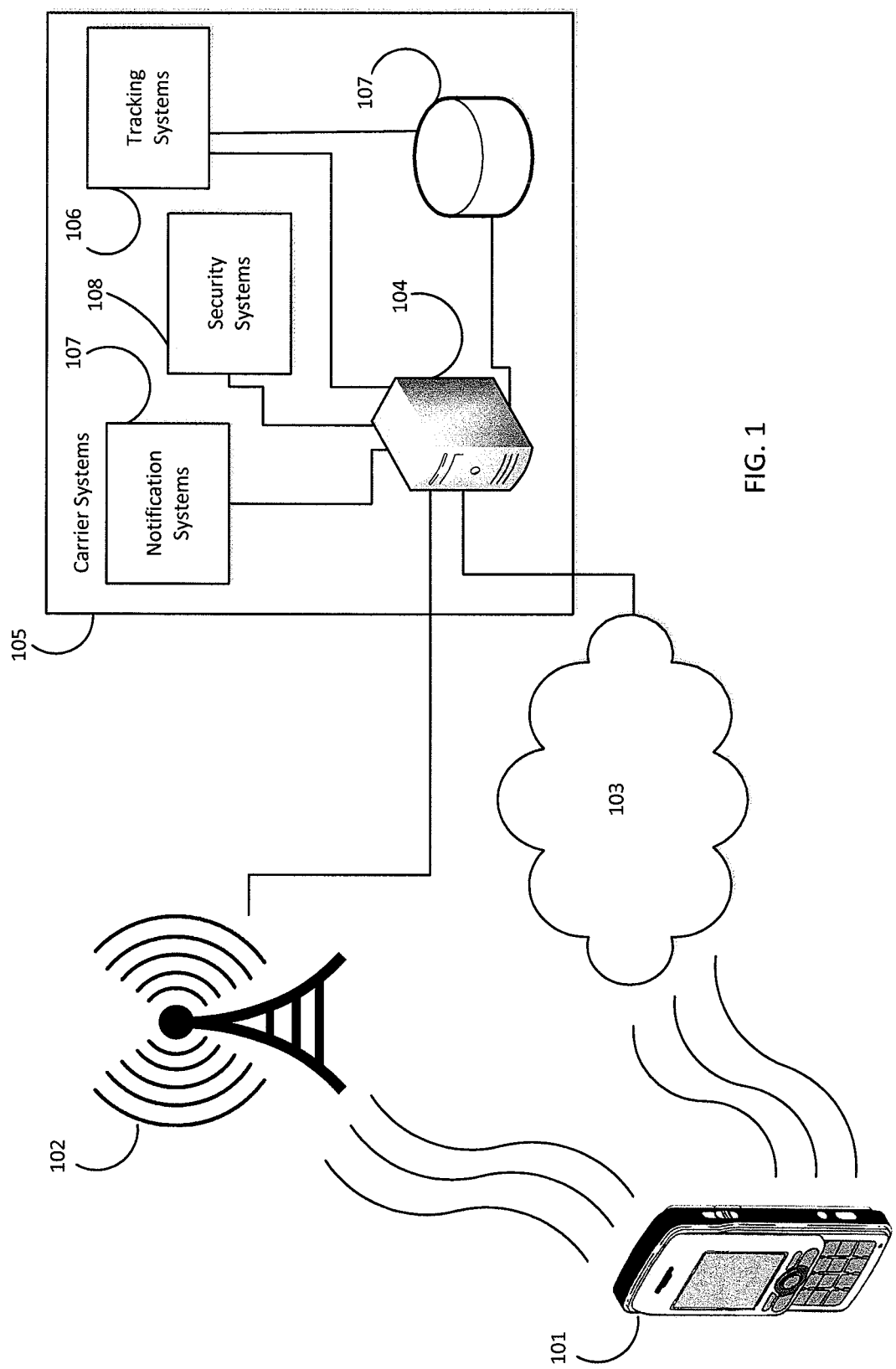

may process information extracted from the image to facilitate shipping the package.

32 Claims, 9 Drawing Sheets

(58) Field of Classification Search
CPC .... G06K 7/1417; G06K 7/1447; G06Q 10/08; G06Q 10/083; G06Q 10/0833; G06Q 10/0835; G06Q 10/0834; H04L 63/123; H04L 63/126; H04N 2201/3218; G06F 11/0766
See application file for complete search history.

(56) References Cited

U.S. PATENT DOCUMENTS

| | | | |
|---|---|---|---|
| 6,460,069 B1 | 10/2002 | Berlin et al. | |
| 6,741,927 B2* | 5/2004 | Jones | G06Q 10/08 340/989 |
| 7,064,681 B2* | 6/2006 | Horstemeyer | B60R 25/102 340/994 |
| 7,293,712 B2 | 11/2007 | Wang | |
| 7,421,400 B2* | 9/2008 | Bilibin | G06Q 10/025 705/7.11 |
| 7,640,169 B2 | 12/2009 | Horton | |
| 7,735,731 B2 | 6/2010 | Skaaksrud et al. | |
| 7,739,202 B2* | 6/2010 | Kadaba | B07C 3/00 705/338 |
| 7,886,972 B2 | 2/2011 | Skaaksrud et al. | |
| 8,079,524 B2 | 12/2011 | He et al. | |
| 8,457,782 B2 | 6/2013 | Ksiazek | |
| 9,679,268 B2* | 6/2017 | Bolton | G06Q 10/0833 |
| 2005/0006469 A1 | 1/2005 | Nonneman et al. | |
| 2006/0136254 A1 | 6/2006 | Greenstein | |
| 2010/0100315 A1 | 4/2010 | Davidson et al. | |
| 2013/0094693 A1 | 4/2013 | Bolton | |

OTHER PUBLICATIONS

EP Office Action (Decision to Refuse European Patent Application) dated Sep. 22, 2017 for EP Application No. 12743849.
Communication from the Examining Division (Minutes of Oral Proceeding) dated Sep. 22, 2017 for EP Application No. 12743849.
Canadian Intellectual Property Office, Requisition by the Examiner for Application No. 2,852,415, Jul. 22, 2015, 3 pages, Canada.
Canadian Intellectual Property Office, Requisition by the Examiner for Application No. 2,852,415, Aug. 18, 2016, 5 pages, Canada.
European Patent Office, Summons to attend Oral Proceeding for Application No. 12743849.7, Dec. 20, 2016, 6 pages, Germany.
International Preliminary Examining Authority, International Preliminary Report on Patentability for International Application No. PCT/US2012/048420, dated Jan. 23, 2014, 18 pages, European Patent Office, Germany.
International Searching Authority, International Search Report and Written Opinion for International Application No. PCT/US2012/048420, dated Nov. 8, 2012, 9 pages, European Patent Office, The Netherlands.
State Intellectual Property Office of the P.R.C., First Office Action for Application No. 201280048127.X, dated Mar. 23, 2016, 18 pages, China.
State Intellectual Property Office of the P.R.C., Notice of Rejection for Application No. 201280048127.X, dated Apr. 5, 2017, 6 pages, China.
State Intellectual Property Office of the P.R.C., Second Office Action for Application No. 201280048127.X, dated Sep. 20, 2016, 15 pages, China.
United States Patent and Trademark Office, Notice of Allowance for U.S. Appl. No. 13/274,461, dated Feb. 8, 2017, 13 pages, U.S.A.
United States Patent and Trademark Office, Office Action for U.S. Appl. No. 13/274,461, dated Sep. 9, 2014, 17 pages, U.S.A.
United States Patent and Trademark Office, Office Action for U.S. Appl. No. 13/274,461, dated Jan. 5, 2015, 16 pages, U.S.A.
United States Patent and Trademark Office, Office Action for U.S. Appl. No. 13/274,461, dated Sep. 24, 2015, 23 pages, U.S.A.
United States Patent and Trademark Office, Office Action for U.S. Appl. No. 13/274,461, dated Mar. 4, 2016, 23 pages, U.S.A.
United States Patent and Trademark Office, Office Action for U.S. Appl. No. 13/274,461, dated Aug. 23, 2016, 33 pages, U.S.A.

* cited by examiner

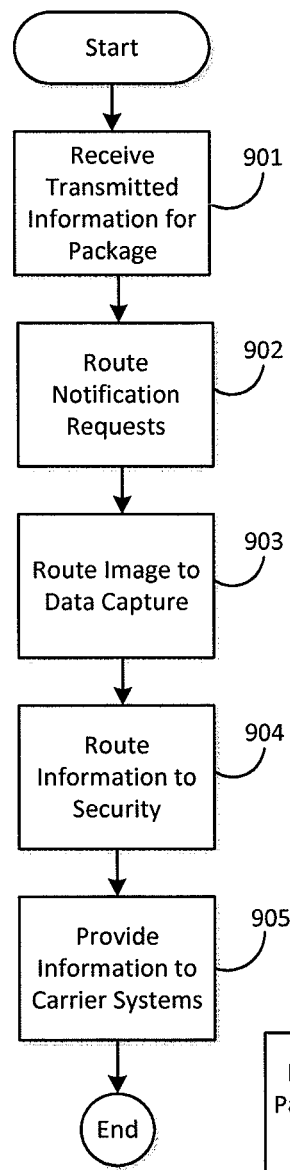
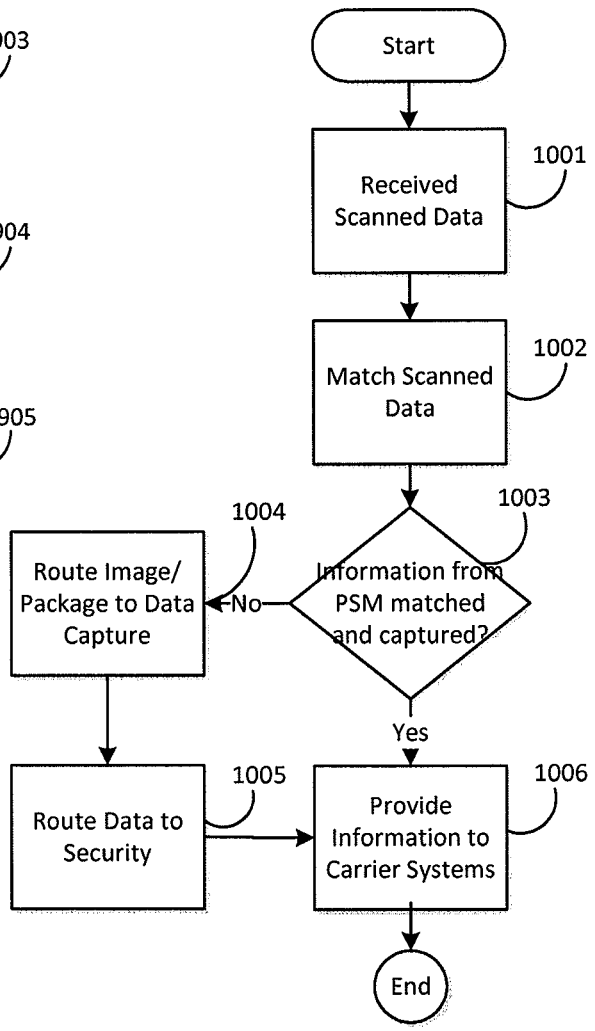
FIG. 9
FIG. 10

SYSTEMS, METHODS, AND COMPUTER PROGRAM PRODUCTS FOR PROCESSING A PACKAGE FOR SHIPPING WITH A COMMON CARRIER ON A WIRELESS COMPUTING DEVICE

CROSS-REFERENCE TO RELATED APPLICATIONS

This application is a continuation of U.S. application Ser. No. 13/274,461, filed Oct. 17, 2011, which is hereby incorporated herein in its entirety by reference.

BACKGROUND OF THE INVENTION

A smartphone is a device that can take care of a user's handheld computing and communication needs in a single, small package. Today, the use of smartphones is becoming increasingly more popular with many individuals. For instance, total shipments in 2010 of smartphone devices were 302.6 million units, up 74.4 percent from 2009. Unlike traditional cell phones, smartphones allow individuals to install, configure, and run applications of their choosing. Similar devices that are becoming increasingly popular are digital tablets. Today's tablet users represent 12 percent of the United States internet population between ages eight and sixty-four. This number is projected to grow to 23 percent by early 2012, a group representing an estimated 54 million people.

Many applications are made available for such devices that users may download and install on their devices. These applications may perform a variety of functions that may aid individuals in their personal and business lives. For example, applications may be made available for providing information on local weather, conducting personal banking transactions, as well as work-related tasks such as accessing, sending, and drafting work-related emails and documents and/or keeping tracking of business related expenses.

Many individuals ship packages for both personal and business reasons. Typically, an individual must fill out one or more forms and/or shipping labels for the package and provide the package to a common carrier for shipment. The common carrier will then take the package and enter the information from the forms and/or shipping labels in the carrier's systems and provide a tracking number to the individual so that the individual may track the package while shipping with the common carrier. For instance, consider the following scenario in which an individual wishing to ship a package arrives at a common carrier's "drop box" collection point and obtains a Paper Shipping Manifest (PSM) form from the box. After writing the required information on the form, the individual affixes the form to the package, and places the package in the "drop box." Subsequent tracking of the package requires an individual to key enter the form's tracking number in the common carrier's tracking application. In addition, if the individual would like to receive notification of certain events that occur during shipping, such as a shipment delay or delivery, the user must perform additional transactions with the common carrier's systems to request notification of these events. Further, if the individual needs the information for the shipment incorporated into another application such as an expense account, the individual must typically enter such information into the application manually. Therefore, a need exists in the art for an application that can facilitate shipping functionality from an individual's wireless computing device.

BRIEF SUMMARY OF THE INVENTION

Various embodiments of present invention provide systems, methods, and computer-program products containing executable code for processing a package for shipping with a common carrier. In various embodiments, the systems include a wireless computing device. The wireless computing device may be one of several types of devices such as smartphone devices, mobile telephones, mobile computers, portable digital assistants (PDAs), laptop computers, gaming devices, electronic tablets, or other types of similar electronic devices. In addition, in various embodiments, the wireless computing device may include imaging capabilities.

In particular embodiments, executable code is provided that can be installed on a wireless computing device so that the code may be executed by at least one processor of the wireless computing device to cause the wireless computing device to perform certain functionality. For instance, in various embodiments, the executable code may be downloaded from a remote location onto the device and installed or may be provided on some type of non-transitory medium.

In various embodiments, the wireless computing device may be configured to record an image of a shipping form for use with the package. In particular embodiments, the wireless computing device may verify the image is suitable for analysis and transmission and extract a tracking number from the image. Further, in particular embodiments, the wireless computing device may transmit the image and the tracking number to a common carrier so that the common carrier can process information extracted from the image and the tracking number in one or more systems of the common carrier to facilitate shipping the package with the common carrier.

In particular embodiments, the verification of the image involves the wireless computing device performing one or more of: (1) determining the entire shipping form has been captured in the image; (2) determining the extracted tracking number is a valid tracking number; (3) determining the quality of the image is acceptable; and (4) verifying completeness of information provided on the shipping form. Further, in particular embodiments, the common carrier may extract information from the image and link the image, the tracking number, or the extracted information to carrier information obtained by the common carrier during shipping of the package.

In particular embodiments, the transmission to the common carrier may also include an identifier for an individual shipping the package so that the common carrier can identify: (1) the individual from the identifier and/or (2) an account the individual has with the common carrier. In one particular embodiment, the common carrier can charge a fee to the account for the individual for shipping the package.

In addition, in particular embodiments, the wireless computing device may be configured to perform additional functionality. For instance, in particular embodiments, the wireless computing device may be further configured to receive one or more notification requests from a user of the wireless computing device. In these particular embodiments, each notification request comprises a request to send a status notification to one or more individuals when a particular event occurs with respect to the package during shipping with the common carrier. Thus, in these particular embodiments, the wireless computing device may transmit the one or more notification requests to the common carrier so that the common carrier can perform sending a status notification in response to each notification request after the particular event associated with the notification request is shown to have occurred in carrier information obtained by the common carrier during shipping of the package.

Further, in particular embodiments, the wireless computing device may be configured to receive a unique shipping reference for the package entered by the user of the wireless computing device. In these particular embodiments, the wireless computing device transmits the unique shipping reference to the common carrier so that the common carrier can use the unique shipping reference as a mechanism for individuals to identify the package for the common carrier. In addition, in particular embodiments, the wireless computing device comprises memory and is further configured to store the image, the tracking number, and related information (such as, for example, information extracted from the image, configuration information, notification requests, etc.) on the wireless computing device so that at least one of the image, the tracking number, and the related information can be retrieved from the memory and displayed on the wireless computing device. While in other embodiments, the wireless computing device is further configured to capture the location of the device and store the location in the memory along with the image and the tracking number.

In particular embodiments, the wireless computing device may also be configured to receive carrier information from the common carrier. In these particular embodiments, the carrier information may include current tracking information on one or more particular events that have occurred during shipping of the package. In addition, the carrier information may include a fee charged by the common carrier for shipping the package. Further, in particular embodiments, the wireless computing device may store the carrier information in memory on the device so that the carrier information can be retrieved from the memory and displayed on the wireless computing device. Finally, in particular embodiments, the wireless computing device may also be configured to retrieve information on the package comprising one or more of the image, the information extracted from the image, the tracking number, or the carrier information and transfer the retrieved information to one or more files or another application residing on the wireless computing device.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 1 provides an illustration of one embodiment of an architecture that can be used to practice various aspects of the present invention.

Figure 2:
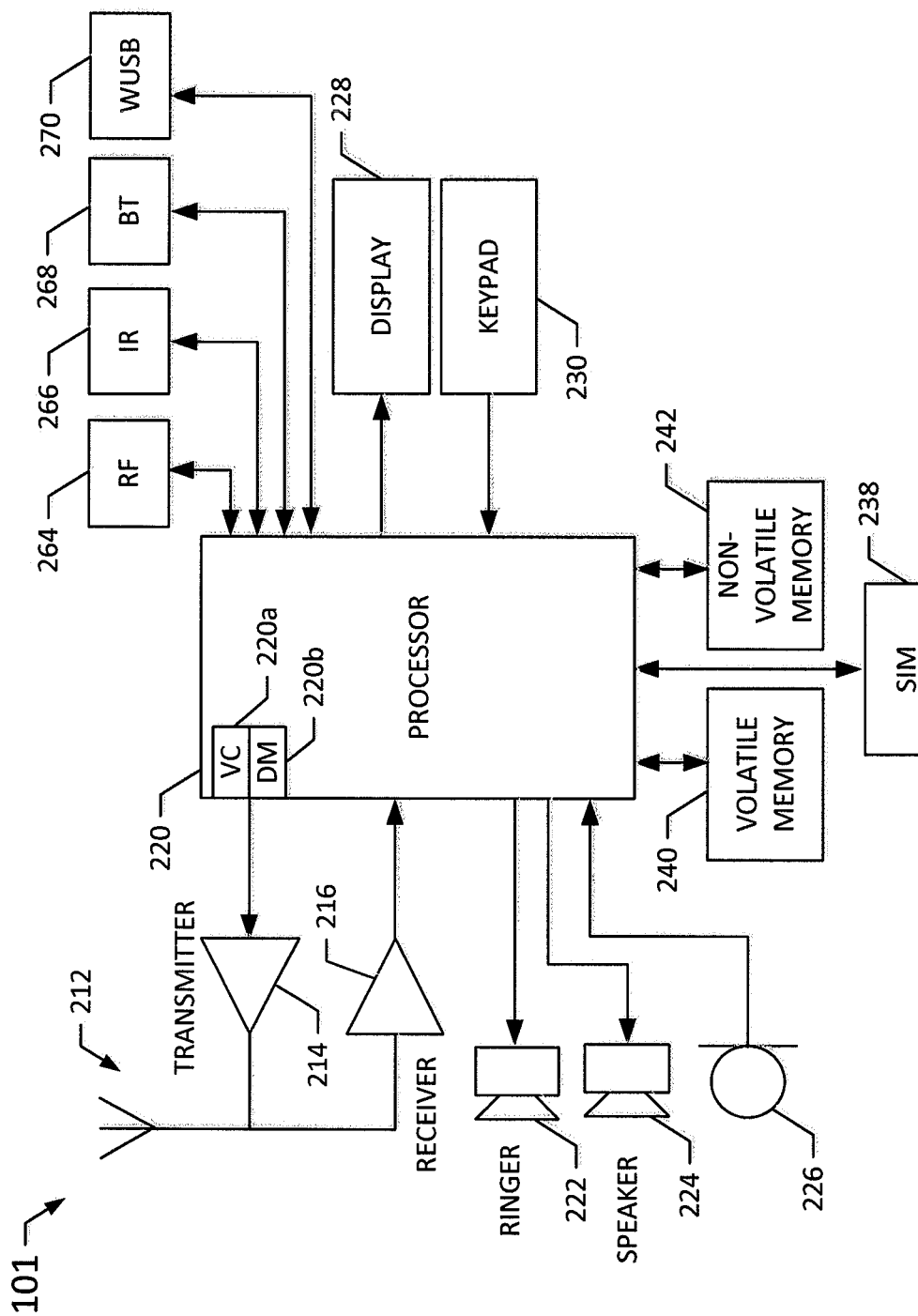

FIG. 2 provides a schematic diagram of a wireless computing device according to one embodiment of the present invention.

Figure 3:
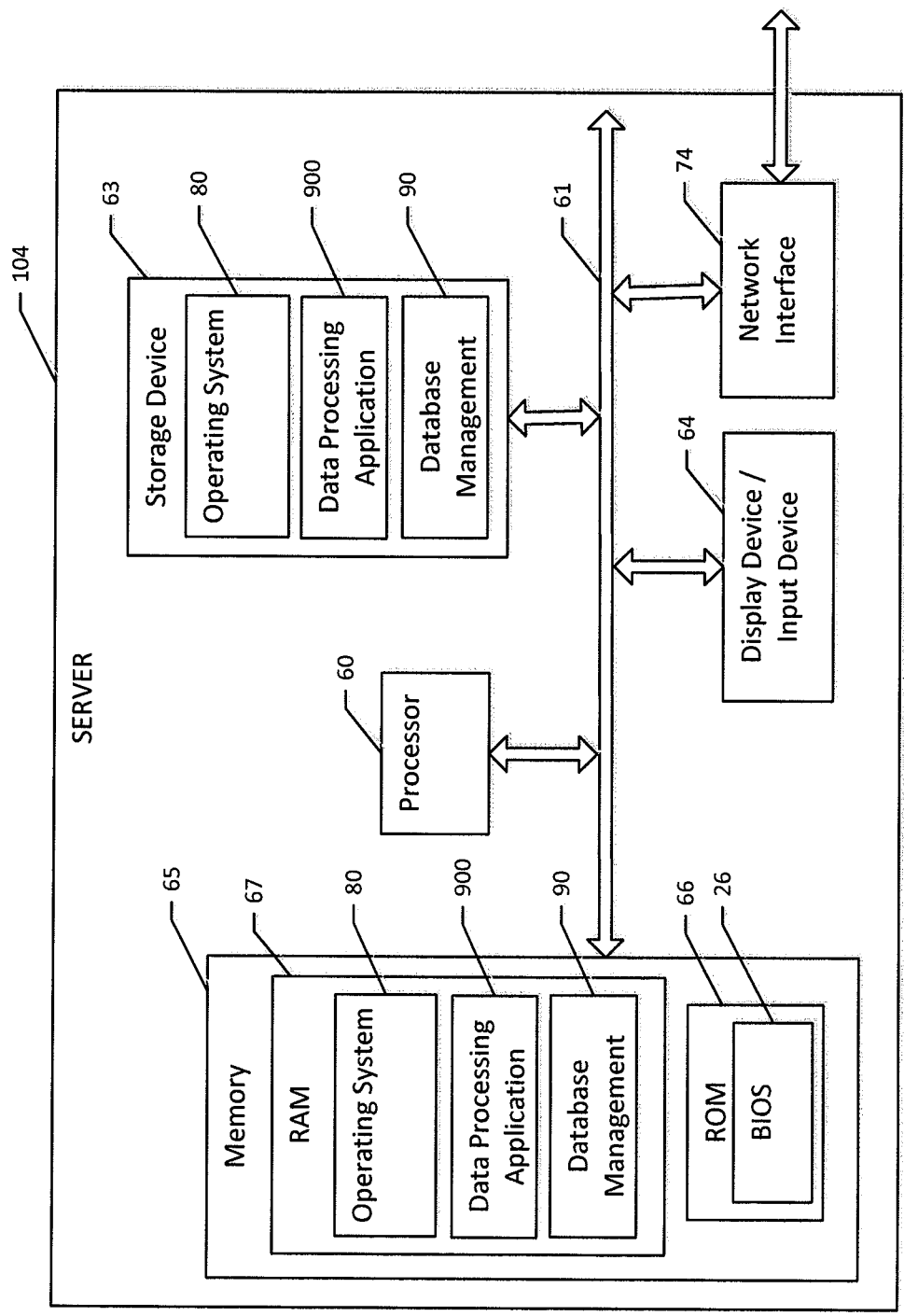

FIG. 3 provides a schematic diagram of a server residing in a common carrier's systems according to one embodiment of the present invention.

Figure 4:
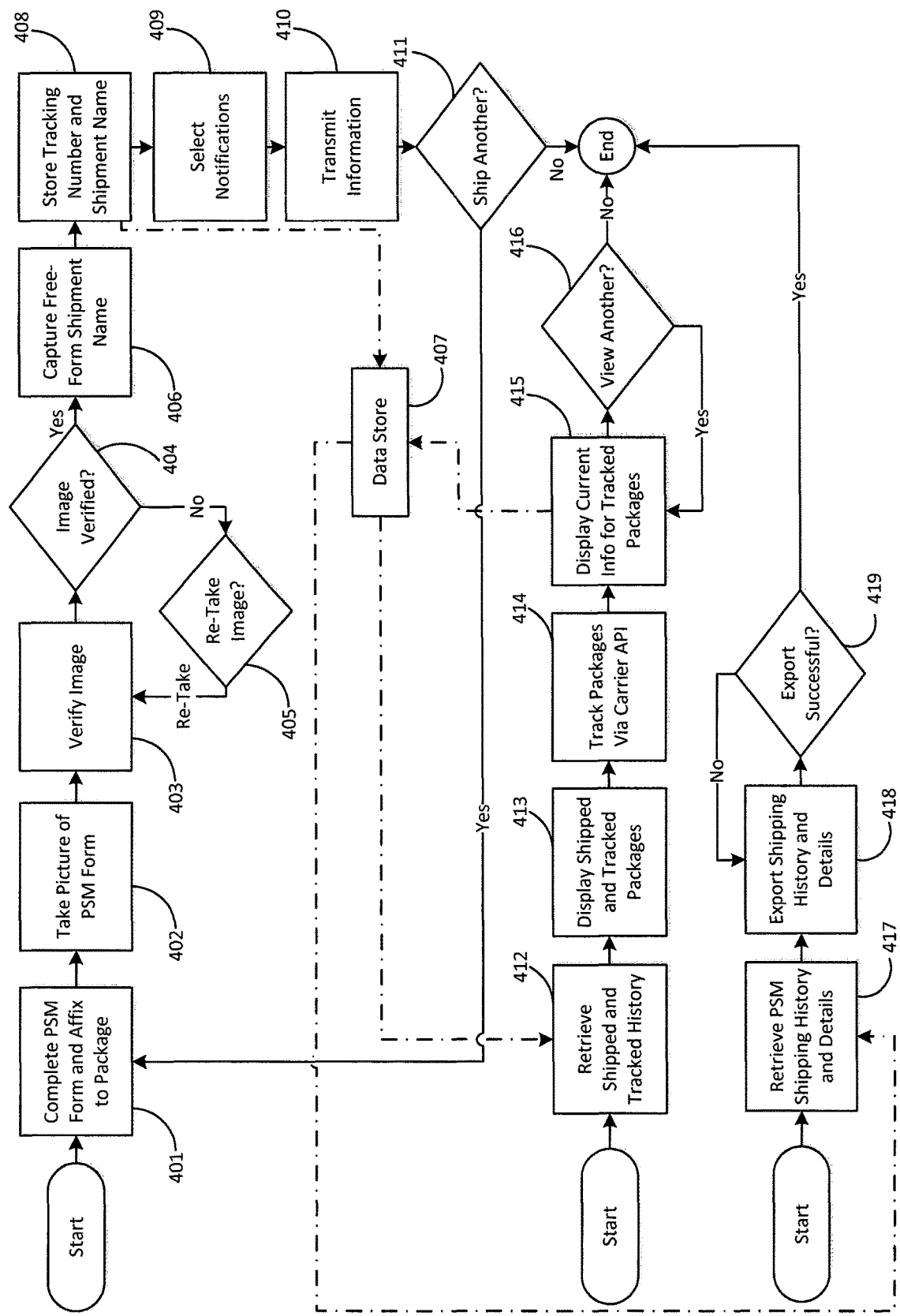

FIG. 4 provides a flowchart for providing package information for a package being shipped with a common carrier according to an embodiment of the present invention.

Figure 5:
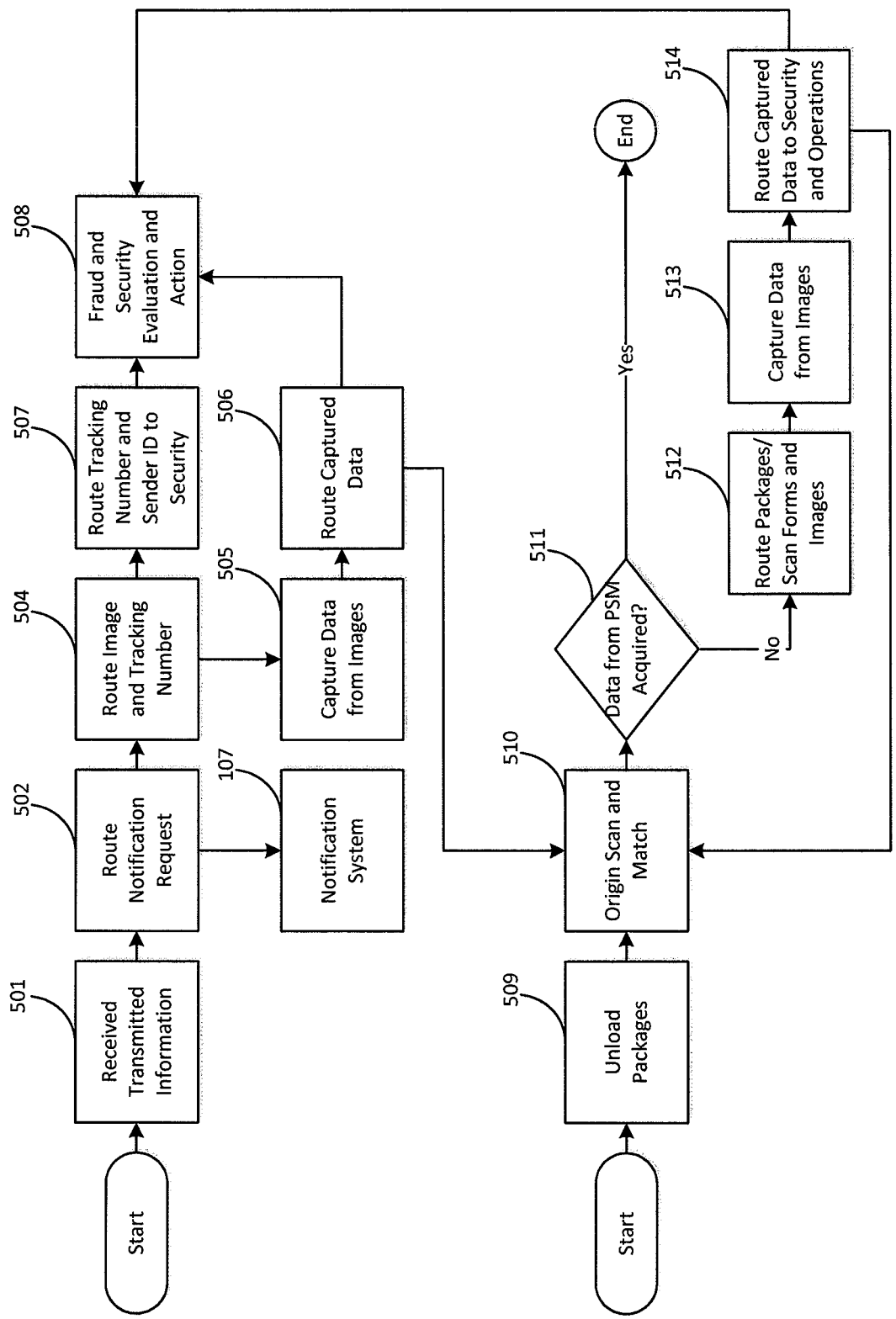

FIG. 5 provides a flowchart for processing information received for a package being shipped with a common carrier according to an embodiment of the present invention.

Figure 6:
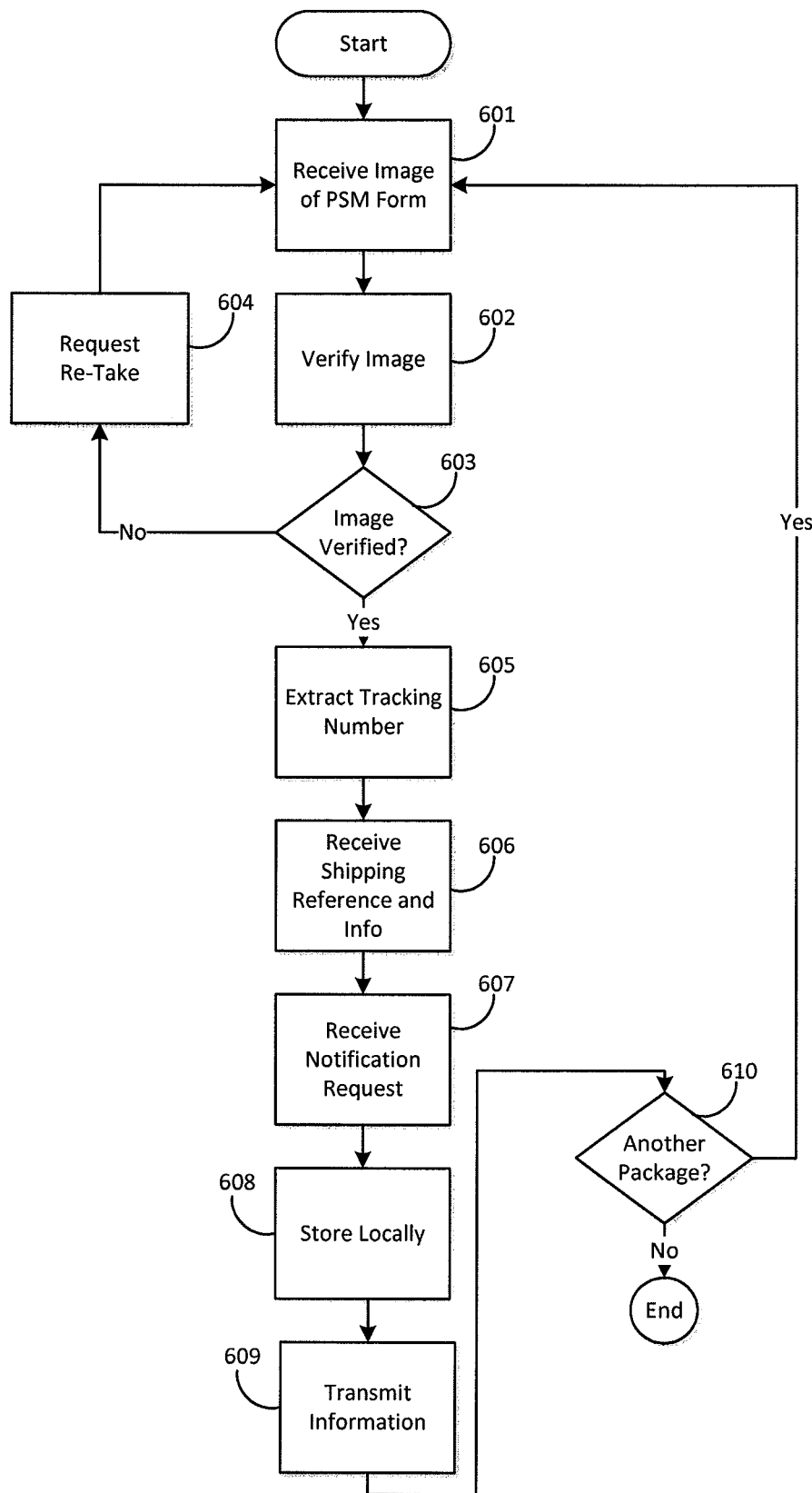

FIG. 6 provides a flow diagram of functionality performed by a PSM application according to one embodiment of the invention.

Figure 7:
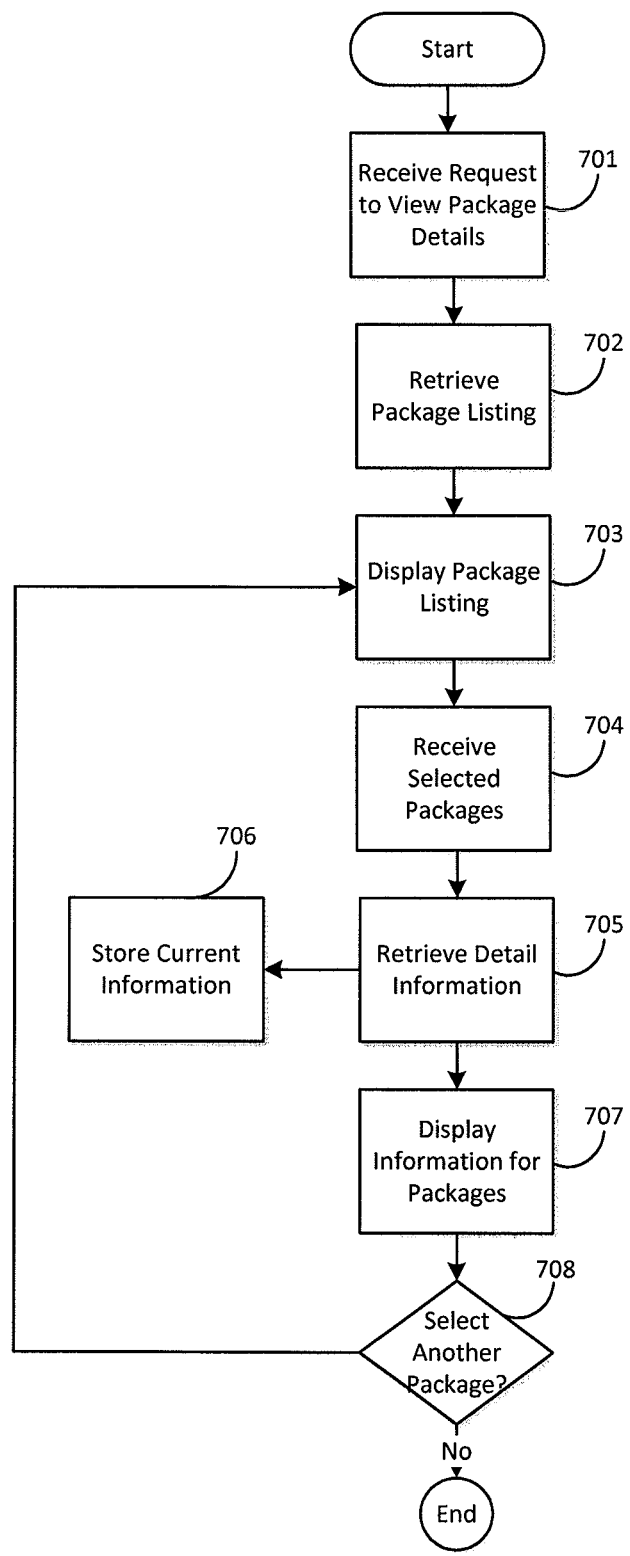

FIG. 7 provides a second flow diagram of functionality performed by the PSM application according to one embodiment of the invention.

Figure 8:
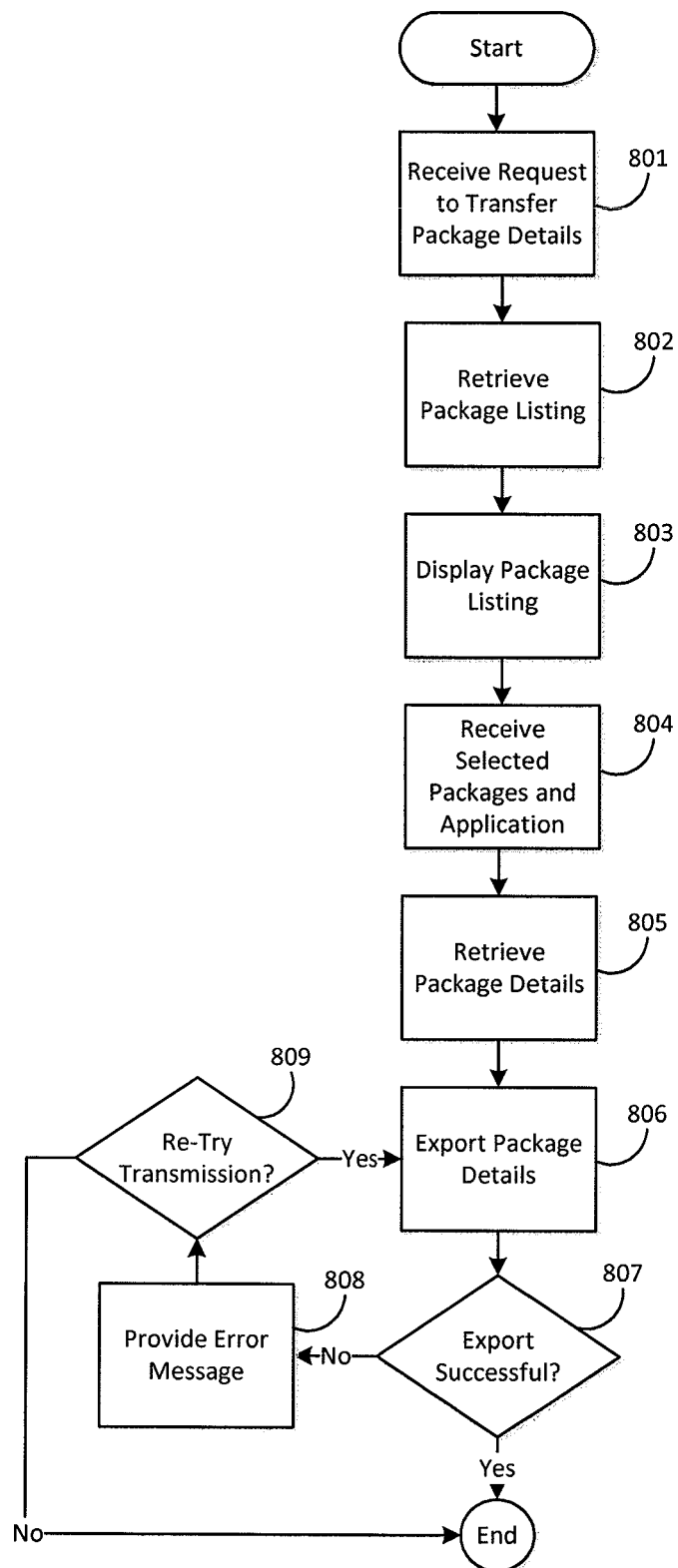

FIG. 8 provides a third flow diagram of functionality performed by the PSM application according to one embodiment of the invention.

FIG. 9 provides a flow diagram of functionality performed by a data processing application according to one embodiment of the invention.

FIG. 10 provides a second flow diagram of functionality performed by the data processing application according to one embodiment of the invention.

DETAILED DESCRIPTION OF THE INVENTION

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. Like numbers refer to like elements throughout.

I. Methods, Apparatus, Systems, and Computer Program Products

As should be appreciated, the embodiments may be implemented in various ways, including as methods, apparatus, systems, or computer program products. Accordingly, the embodiments may take the form of an entirely hardware embodiment or an embodiment in which a processor is programmed to perform certain steps. Furthermore, the various implementations may take the form of a computer program product on a computer-readable storage medium having computer-readable program instructions embodied in the storage medium. Any suitable computer-readable storage medium may be utilized including hard disks, CD-ROMs, optical storage devices, or magnetic storage devices.

Particular embodiments are described below with reference to block diagrams and flowchart illustrations of methods, apparatus, systems, and computer program products. It should be understood that each block of the block diagrams and flowchart illustrations, respectively, may be implemented in part by computer program instructions, e.g., as logical steps or operations executing on a processor in a computing system. These computer program instructions may be loaded onto a computer, such as a special purpose computer or other programmable data processing apparatus to produce a specifically-configured machine, such that the instructions which execute on the computer or other programmable data processing apparatus implement the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the functionality specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide operations for implementing the functions specified in the flowchart block or blocks.

Accordingly, blocks of the block diagrams and flowchart illustrations support various combinations for performing the specified functions, combinations of operations for performing the specified functions and program instructions for performing the specified functions. It should also be understood that each block of the block diagrams and flowchart illustrations, and combinations of blocks in the block diagrams and flowchart illustrations, can be implemented by special purpose hardware-based computer systems that perform the specified functions or operations, or combinations of special purpose hardware and computer instructions.

II. Exemplary System Architecture

FIG. 1 provides an illustration of a system architecture that can be used in conjunction with various embodiments of the present invention. As shown in FIG. 1, the system architecture may include one or more wireless computing devices 101. For instance, the wireless computing devices 101 may be smartphone devices, mobile telephones, mobile computers, portable digital assistants (PDAs), laptop computers, gaming devices, electronic tablets, and other types of similar electronic devices. In addition, in various embodiments, the wireless computing devices 101 may include digital imaging capabilities.

Further, in various embodiments, the one or more wireless computing devices 101 are in communication with one or more additional systems. For instance, in particular embodiments, one or more of the wireless computing devices 101 are in cellular communication with one or more cellular service providers 102. As discussed in greater detail below, these wireless computing devices 101 may transmit and receive data over cellular communication channels to help facilitate tracking shipped packages and requesting and receiving status notifications for these shipped packages. In addition, these cellular service providers 102 may be in electronic communication with one or more carrier systems 105 associated with a common carrier shipping the packages to facilitate the transfer of information between the wireless computing devices 101 and the common carrier used for shipping the packages. Such communication may be facilitated over the same or different wireless or wired networks including, for example, a wired or wireless Personal Area Network (PAN), Local Area Network (LAN), Metropolitan Area Network (MAN), Wide Area Network (WAN), or the like. In addition, in particular embodiments, one or more of the wireless computing devices 101 may be in communication (directly or indirectly) with the carrier systems 105 over a wireless network.

In various embodiments, the one or more carrier systems 105 may include sub-systems and/or components such as servers and storage media. For instance, in FIG. 1, the carrier systems 105 include one or more tracking systems 106 for tracking packages as the packages are shipped with the common carrier, one or more notification systems 107 for setting up shipping notifications, and one or more security systems 108 for facilitating security functionality. In addition, in particular embodiments, the carrier systems 105 include one or more servers 104. In particular instances, these one or more servers 104 may be in communication with one or more types of storage media 107. In addition, the one or more servers 104 may include a database management system and the storage media 107 may include one or more databases and one or more database instances. In various embodiments, the storage media 107 may be one or more types of media such as hard disks, magnetic tapes, optical media, or flash memory. The term "database" refers to a structured collection of records or data that is stored in a computer system, such as via a relational database, hierarchical database, or network database.

It should be noted that other system architectures are contemplated that may be used to practice various aspects of the invention. Thus, the system architecture provided in FIG. 1 is for illustrative purposes only and should not be construed to limit the scope of the invention. Further, while FIG. 1 illustrates certain system entities as separate, standalone entities, the various embodiments are not limited to this particular architecture.

a. Exemplary Wireless Computing Device

FIG. 2 provides a schematic diagram of a wireless computing device 101 according to one embodiment of the present invention. In this particular instance, the wireless computing device 101 is a smartphone. However, it should be understood that the wireless computing device 101 illustrated and hereinafter described is merely illustrative of one type of device that may implement and/or benefit from various embodiments and, therefore, should not be taken to limit the scope of the invention. Thus, it should be noted that other types of electronic devices, such as mobile telephones, mobile computers, portable digital assistants (PDAs), laptop computers, gaming devices, electronic tablets, and other types of similar electronic devices, may employ various embodiments of the invention.

As shown, the wireless computing device 101 may include an antenna 212 (or multiple antennas 212) in communication with a transmitter 214 and a receiver 216. The wireless computing device 101 may also include a processor 220 (e.g., application processor and/or graphics processor) configured to provide signals to and receive signals from the transmitter 214 and receiver 216, respectively.

The processor 220 may, for example, be embodied as various configurations including circuitry, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 2 as a single processor, in some embodiments the processor 220 comprises a plurality of processors.

The signals sent and received by the processor 220 may include signaling information in accordance with an air interface standard of an applicable cellular system, and/or any number of different wireless networking techniques, comprising but not limited to Wi-Fi, wireless local access network (WLAN) techniques such as Bluetooth™ (BT), Ultra-wideband (UWB), Institute of Electrical and Electronics Engineers (IEEE) 802.11, 802.16, and/or the like. In addition, these signals may include speech data, user generated data, user requested data, and/or the like.

In this regard, the wireless computing device 101 may be capable of operating with one or more air interface standards, communication protocols, modulation types, access types, and/or the like. More particularly, the wireless computing device 101 may be capable of operating in accordance with various first generation (1G), second generation (2G), 2.5G, third-generation (3G) communication protocols, fourth-generation (4G) communication protocols, Internet Protocol Multimedia Subsystem (IMS) communication protocols (for example, session initiation protocol (SIP)), and/or the like. For example, the wireless computing device 101 may be capable of operating in accordance with 2G wireless communication protocols IS-136 (Time Division Multiple Access (TDMA)), Global System for Mobile communications (GSM), IS-95 (Code Division Multiple Access (CDMA)), and/or the like. Also, for example, the wireless computing device 101 may be capable of operating in accordance with 2.5G wireless communication protocols General Packet Radio Service (GPRS), Enhanced Data GSM Environment (EDGE), and/or the like. Further, for example, the wireless computing device 101 may be capable of operating in accordance with 3G wireless communication protocols such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The wireless computing device 101 may be additionally capable of operating in accordance with 3.9G wireless communication protocols such as Long Term Evolution (LTE) or Evolved Universal Terrestrial Radio Access Network (E-UTRAN) and/or the like. Additionally, for example, the wireless computing device 101 may be capable of operating in accordance with fourth-generation (4G) wireless communication protocols such as LTE Advanced and/or the like as well as similar wireless communication protocols that may be developed in the future.

Some Narrow-band Advanced Mobile Phone System (NAMPS), as well as Total Access Communication System (TACS), wireless computing devices 101 may also benefit from embodiments of this invention, as should dual or higher mode phones (for example, digital/analog or TDMA/CDMA/analog phones). Additionally, the wireless computing device 101 may be capable of operating according to Wi-Fi or Worldwide Interoperability for Microwave Access (WiMAX) protocols.

It is understood that the processor 220 may comprise circuitry for implementing audio/video and logic functions of the wireless computing device 101. For example, the processor 220 may comprise a digital signal processor device, a microprocessor device, an analog-to-digital converter, a digital-to-analog converter, and/or the like. Control and signal processing functions of the wireless computing device 101 may be allocated between these devices according to their respective capabilities. Additionally, the processor 220 may comprise an internal voice coder (VC) 220a, an internal data modem (DM) 220b, and/or the like. Further, the processor 220 may comprise functionality to operate one or more software programs, which may be stored in memory. For example, the processor 220 may be capable of operating a connectivity program, such as a web browser. The connectivity program may allow the wireless computing device 101 to transmit and receive web content, such as location-based content, according to a protocol, such as Wireless Application Protocol (WAP), hypertext transfer protocol (HTTP), and/or the like. The wireless computing device 101 may be capable of using a Transmission Control Protocol/Internet Protocol (TCP/IP) to transmit and receive web content across the internet or other networks.

The wireless computing device 101 may also comprise a user interface including, for example, an earphone or speaker 224, a ringer 222, a microphone 226, a display 228, a user input interface, and/or the like, which may be operationally coupled to the processor 220. In this regard, the processor 220 may comprise user interface circuitry configured to control at least some functions of one or more elements of the user interface, such as, for example, the speaker 224, the ringer 222, the microphone 226, the display 228, and/or the like. The processor 220 and/or user interface circuitry comprising the processor 220 may be configured to control one or more functions of one or more elements of the user interface through computer program instructions (for example, software and/or firmware) stored on memory accessible to the processor 220 (for example, volatile memory 240, non-volatile memory 242, and/or the like). Although not shown, the wireless computing device 101 may comprise a battery for powering various circuits related to the wireless computing device 101, for example, a circuit to provide mechanical vibration as a detectable output. The user input interface may comprise devices allowing the wireless computing device 101 to receive data, such as a keypad 230, a touch display (not shown), a joystick (not shown), and/or other input device. In embodiments including a keypad, the keypad may comprise numeric (0-9) and related keys (#, *), and/or other keys for operating the wireless computing device 101.

As shown in FIG. 2, the wireless computing device 101 may also include one or more components for sharing and/or obtaining data. For example, the wireless computing device 101 may comprise a short-range radio frequency (RF) transceiver and/or interrogator 264 so data may be shared with and/or obtained from electronic devices in accordance with RF techniques. The wireless computing device 101 may comprise other short-range transceivers, such as, for example, an infrared (IR) transceiver 266, a Bluetooth™ (BT) transceiver 268 operating using Bluetooth™ brand wireless technology developed by the Bluetooth™ Special Interest Group, a wireless universal serial bus (USB) transceiver 270 and/or the like. The Bluetooth™ transceiver 268 may be capable of operating according to low power or ultra-low power Bluetooth™ technology (for example, Wibree™) radio standards. In this regard, the wireless computing device 101 and, in particular, the short-range transceiver may be capable of transmitting data to and/or receiving data from electronic devices within a proximity of the wireless computing device 101, such as within 10 meters, for example. Although not shown, the wireless computing device 101 may be capable of transmitting and/or receiving data from electronic devices according to various wireless networking techniques, including 6LoWpan, Wi-Fi, Wi-Fi low power, WLAN techniques such as IEEE 802.11 techniques, IEEE 802.15 techniques, IEEE 802.16 techniques, and/or the like.

The wireless computing device 101 may comprise memory, such as a subscriber identity module (SIM) 238, a removable user identity module (R-UIM), and/or the like, which may store information elements related to a mobile subscriber. In addition to the SIM, the wireless computing device 101 may comprise other removable and/or fixed memory. The wireless computing device 101 may include volatile memory 240 and/or non-volatile memory 242. For example, volatile memory 240 may include Random Access Memory (RAM) including dynamic and/or static RAM, on-chip or off-chip cache memory, and/or the like. Non-volatile memory 242, which may be embedded and/or removable, may include, for example, read-only memory, flash memory, magnetic storage devices (for example, hard disks, floppy disk drives, magnetic tape, etc.), optical disc drives and/or media, non-volatile random access memory (NVRAM), and/or the like. Like volatile memory 240, non-volatile memory 242 may include a cache area for temporary storage of data. The memories may store one or more applications (e.g., software programs), instructions, pieces of information, data, and/or the like which may be used by the wireless computing device 101 for performing functions of the wireless computing device 101. For instance, as described in greater detail below, one or more of the memories on the device 101 may store a Paper Shipping Manifest (PSM) application in various embodiments that performs various aspects of the claimed invention.

b. Exemplary Server

FIG. 3 provides a schematic of a server 104 residing in the common carrier's systems 105 according to one embodiment of the present invention. In general, the term "server" may refer to, for example, any computer, computing device, mobile phone, desktop, notebook or laptop, distributed system, server, blade, gateway, switch, processing device, or combination of processing devices adapted to perform the functions described herein. As will be understood from this figure, in one embodiment, the server 104 may include a processor 60 that communicates with other elements within the server 104 via a system interface or bus 61. The processor 60 may be embodied in a number of different ways. For example, the processor 60 may be embodied as one or more processing elements, one or more microprocessors with accompanying digital signal processors, one or more processors without an accompanying digital signal processors, one or more coprocessors, one or more multi-core processors, one or more controllers, and/or various other processing devices including integrated circuits such as, for example, an application specific integrated circuit (ASIC), a field programmable gate array (FPGA), a hardware accelerator, and/or the like.

In an exemplary embodiment, the processor 60 may be configured to execute instructions stored in the device memory or otherwise accessible to the processor 60. As such, whether configured by hardware or software methods, or by a combination thereof, the processor 60 may represent an entity capable of performing operations according to embodiments of the present invention when configured accordingly. A display device/input device 64 for receiving and displaying data may also be included in or associated with the server 104. The display device/input device 64 may be, for example, a keyboard or pointing device that is used in combination with a monitor. The server 104 may further include transitory and non-transitory memory, which may include both random access memory (RAM) 67 and read only memory (ROM) 65. The server's ROM 65 may be used to store a basic input/output system (BIOS) 26 containing the basic routines that help to transfer information to the different elements within the server 104.

In addition, in one embodiment, the server 104 may include at least one storage device 63, such as a hard disk drive, a CD drive, a DVD drive, and/or an optical disk drive for storing information on various computer-readable media. The storage device(s) 63 and its associated computer-readable media may provide nonvolatile storage. The computer-readable media described above could be replaced by any other type of computer-readable media, such as embedded or removable multimedia memory cards (MMCs), secure digital (SD) memory cards, Memory Sticks, electrically erasable programmable read-only memory (EEPROM), flash memory, hard disk, and/or the like. Additionally, each of these storage devices 63 may be connected to the system bus 61 by an appropriate interface.

Furthermore, a number of program applications (e.g., modules) may be stored by the various storage devices 63 and/or within RAM 67. Such program modules may include an operating system 80 and a data processing application 900. As discussed in greater detail below, this application 900 may control certain aspects of the operation of the server 104 with the assistance of the processor 60 and operating system 80, although its functionality need not be modularized. In addition to the program applications, the server 104 may store and/or be in communication with one or more storage media 107.

Also located within and/or associated with the server 104, in one embodiment, is a network interface 74 for interfacing with various computing entities. This communication may be via the same or different wired or wireless networks (or a combination of wired and wireless networks), as discussed above. For instance, the communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), and/or any other wired transmission protocol. Similarly, the server 104 may be configured to communicate via wireless external communication networks using any of a variety of protocols, such as 802.11, GPRS, UMTS, CDMA2000, WCDMA, TD-SCDMA, LTE, E-UTRAN, Wi-Fi, WiMAX, UWB, and/or any other wireless protocol.

It will be appreciated that one or more of the server's 104 components may be located remotely from other server 104 components. Furthermore, one or more of the components may be combined and additional components performing functions described herein may be included in the server 104.

III. General Overview of the Process

FIGS. 4 and 5 provide flowcharts for processing package information for a package being shipped with a common carrier. In particular embodiments, the individual shipping the package may first register with the common carrier before engaging in this process. For instance, in one embodiment, the individual visits a website for the common carrier over the Internet and selects a button on the website to set up an account with the common carrier so that the individual may participate in various aspects of the invention. Once the individual has selected the button on the website, the website may take the individual to one or more webpages that request information from the individual such as, for example, the individual's name, address, phone, and email information, which may simplify the shipping process for packages by providing these data items in addition to, or in lieu of, handwritten information on a shipping form and/or label. In addition, the individual may provide billing preferences that may simplify the shipping process, including account number, account authentication information, credit card number, and credit card authentication information. In various embodiments, the individual's population of these preferences can enable invoicing the individual (e.g., customer) without the need to enter billing information on the shipping forms and/or labels, or in the event the handwritten billing information on such forms or labels is illegible. Further, the individual may provide notification preferences that simplify the process of requesting carrier notifications, including notification types (e.g. delivery, etc.) and notification methods (e.g. email, SMS text, PSM application residing on the device, etc.) selected by the individual as default requests. Thus, the individual may indicate his or her preferences to receive status notifications for various packages shipped with the common carrier.

Once the individual has provided all of the required information and has set up an account with the common carrier, the common carrier may instruct the individual to download an application (e.g., the PSM application) to the individual's wireless computing device 101. As previously mentioned, the wireless computing device 101 may be any one of a number of types of wireless computing devices. Thus, the individual may visit the application store (e.g., website) for his or her cellular and/or smartphone provider using a web browser or other application on the wireless computing device 101 and may download and install the PSM application on the individual's wireless computing device 101.

Thus, turning to FIG. 4, the individual wishes to ship a package and visits a "drop box" collection point for the common carrier and obtains a Paper Shipping Manifest (PSM) form from the box. In this particular example, the PSM form is provided by the common carrier for use with various aspects of the invention. However, it should be understood by those of ordinary skill in the art that other types of forms may be used such as typical shipping labels placed on packages for shipping.

After writing the required information on the form and completing the form, the individual affixes the PSM form to the package, shown as Step 401. In Step 402, the individual uses the camera on his or her wireless computing device 101 to take a digital image of the PSM form and invokes the PSM application. Once the application is active, the individual selects an option in the application for shipping a package. In response, the PSM application requests the individual to select the image taken of the PSM form and once selected, the PSM application analyzes the image to verify the required information is obtainable from the image, shown as Step 403. For instance, in one particular embodiment, the PSM application analyzes the image to ensure: (1) the entire PSM form is captured in the image, (2) the common carrier tracking number can be extracted from the PSM form via the image bar code and/or tracking number characters and the tracking number is valid, and (3) the image is of adequate quality and/or completeness of any handwritten information provided on the PSM form. In addition, in particular instances, the PSM application extracts information from the image. Further, in particular instances, the PSM application may conduct handwriting recognition and conversion to detailed shipment data elements such as, for example, ship-to name and address and requested shipping services.

In Step 404, if the PSM application determines the digital image is not suitable for transmission to the common carrier, the PSM application may request the individual to re-take the image of the PSM form, shown in Step 405. Thus, the individual re-takes the image and the PSM application verifies the re-taken image. At any point after capture of a suitable digital image, the individual may place the package into the common carrier's "drop box" collection point.

If the PSM application determines the digital image is suitable, the PSM application requests and captures a free-form shipment name from the individual in particular embodiments (e.g., request the individual to "tag" the shipment), shown in Step 406. For example, the individual may be shipping the package to a client that includes a purchase contract and the individual provides the shipment name of "client's purchase contract." Having such a name may help the individual to more quickly recognize the particular package from a listing of shipments the individual has made with the common carrier. At this point, the PSM application may store the carrier tracking number, the digital image of the PSM form, information extracted from the digital image, and the free-form shipment name in local memory 407 on the wireless computing device 101, shown as Step 408.

In particular embodiments, the individual is provided an opportunity to request one or more notifications from the common carrier when significant transportation events occur during shipping, such as, for example, a shipping delay or delivery. Thus, in these particular embodiments, the PSM application requests the individual to indicate whether he or she would like to set up any notification requests and receives the selection of such requests from the individual, shown as Step 409.

In Step 410, the PSM application transmits the carrier tracking number, the digital image of the PSM form, the individual's associated name for the package, the individual's one or more notification requests for the package, and an identifier linked to the individual's registration information to the common carrier's systems 105. As a result, the common carrier stores the received information and sets up the notification requests. At this point, the PSM application may inquire whether the individual wishes to ship another package, shown as Step 411. If so, the process returns to the step in which the individual completes and attaches a new PSM form to the next package.

In particular embodiments, the PSM application may periodically query the common carrier using the common carrier's APIs to determine whether shipment data is available in the carrier's systems 105 for the package. At that point, the PSM application may download and store the shipment details for the package locally on the individual's device 101. These details may include such information as ship-to name and address, accessorials selected, scheduled delivery date, tracking information, and other carrier collected or derived information.

In addition, in particular embodiments, the PSM application is configured to allow the individual to review shipping and/or tracking details for various packages on the individual's wireless computing device 101. For instance, the individual may invoke the PSM application and select the option to view the shipping and/or tracking details for a particular package the individual had previously shipped. In Step 412, the PSM application retrieves the shipping and tracking history stored locally on the device 101 and displays a list of the packages retrieved from the history, shown as Step 413. In addition, in various embodiments, the PSM application retrieves the latest tracking information for the packages (and, in some instances, information for any additional packages not found in the local history but were also shipped by the individual) from the common carrier and stores the retrieved information locally on the individual's device 101, shown as Step 414.

Once the PSM application has retrieved the information from the local memory and from the common carrier's systems 105, the PSM application displays the information on the device 101 for the individual to view, shown as Step 415. For example, the PSM application provides a list of the packages by listing the individual's free-form shipment names. The individual selects a particular package from the list and the PSM application displays all of the details for the selected package. At this point, the individual may select another package to view or may exit the option in the application, shown in Step 416. If the individual selects another package to view, the details for the next selected package are displayed.

Further, in particular embodiments, the PSM application may be configured to transfer shipping history and details for packages to other applications residing on the device 101 and/or residing remotely from the device 101. For instance, the individual may have shipped one or more of the packages for business reasons. Returning to the example above, the individual may have shipped a package that contained a purchase contract for a client. In this particular instance, the individual may need to list the cost of shipping the package on an expense report. Thus, the individual invokes the PSM application and selects the option to transfer the shipping history and details for the package to the individual's expense report application that also resides on the individual's wireless computing device 101. The PSM application displays a list of the packages that have history available locally on the device 101 and the individual selects the particular package in which the contract was shipped. In response, the PSM application retrieves the shipping history and details for the selected package, shown as Step 417, and exports at least a portion of the shipping history and details to one or more files or directly to the expense report application, shown as Step 418. For example, the PSM application may transmit the package tracking number, the name of the common carrier, the ship-to address, and the cost of the shipment to a file compatible with the expense report application.

In Step 419, the PSM application then determines whether the information has been successfully exported and if not, the application may indicate the unsuccessful export to the individual and the reason for the unsuccessful export. For instance, a particular piece of the shipping details may not be in the proper format for the expense report application to accept. The individual may then correction the problem (like eliminating the particular piece of information from the export) and retry the export. As a result, the shipping history and details for the package may be imported into the individual's expense report application and the individual may then include the expense for shipping the package in an expense report without having to manually enter the information for the package.

Turning now to FIG. 5, the flowchart on this particular figure displays the functionality that may be carried out by the common carrier's systems 105 upon receiving the transmitted information for a package from the PSM application residing on the individual's wireless computing device 101 and upon receiving and processing the package at the carrier's facility. In Step 501, the common carrier's systems 105 receive the transmitted data sent by the PSM application. Once the common carrier's systems 105 receive the transmitted data, the carrier's systems 105 route the one or more notification requests to one or more notification systems 107, shown as Step 502. The notification systems 107 set up the requests so that a notification is sent to the individual and/or other individuals, such as the recipient of the package, upon particular events occurring during shipping of the package. For instance, the individual may have requested a notification be sent to himself or herself and the recipient if the package is delayed for more than twenty-four hours. Thus, the notification systems 107 interpret the requests and ensure the proper mechanisms are in place for the requests.

For example, the common carrier's tracking systems 106 may evaluate the movement of the package during shipment based on scans taken of the package's label as the package travels along with the common carrier. In this instance, if the systems 106 determine the package has not made a movement within a particular period of time, the systems 106 may send the individual and the recipient a notification indicating the package has been delayed. As previously mentioned, the notifications may be sent using any number of different options such as emails, texts, and/or telephone calls. Further, the systems 106 may review the individual's account set up with the common carrier to determine whether the individual has indicated a preferred method for receiving notifications.

In Step 504, the carrier's systems 105 route the received information, such as the image of the PSM form and the tracking number to other systems within the common carrier. For instance, in particular embodiments, the image is routed to one or more systems in order to capture additional information from the image, shown as Step 505. In these particular embodiments, this step may involve forwarding the image to an individual who reads the image and key enters additional information from image. Other embodiments may also employ handwriting recognition software and/or data correction software to extract additional information from the image and/or to correct information previously extracted from the image.

In addition, in particular embodiments, the tracking number and the shipment details captured from the image of the PSM form are routed to other carrier processes that consume such data, including operations systems, fraud detection systems, and security evaluation systems, shown as Steps 506, 507, and 508. As a result, the information gathered from the PSM form is available for use within the common carrier's systems 105.

Thus, the common carrier arrives at the "drop box" collection point, picks up the package, and later returns to the carrier's local operating or "origin" center. At the "origin" center, employees unload the package and scan the tracking number on PSM form affixed to the package, shown as Step 509. The carrier's systems 105 then match the tracking number to tracking number received from the PSM application, shown as Step 510. At Step 511, if a match is successful and the associated shipment data has been captured from the digital image, the common carrier's systems 105 process the package normally. However, if a match is unsuccessful or the associated shipment data has not been captured from the digital image, then the carrier's operations personnel may need to initiate a data capture process for the shipment. For instance, in one particular embodiment, the carrier's operations personnel may route the package or a sheet removed from the PSM form to a location where the shipment data can be keyed in manually, or where the PSM form can be imaged for data capture from the image, shown as Steps 512 and 513. Once the data has been properly captured, the data may be routed to security and operations, shown as Step 514. At this point, the common carrier's systems 105 may process the package normally.

IV. Exemplary System Operation

Reference will now be made to FIGS. 6-10. FIG. 6 provides a flow diagram of the PSM application in which the application processes a package for shipment according to a particular embodiment. FIG. 7 provides a flow diagram of the PSM application in which the application receives a request to view the package details for a particular package according to a particular embodiment. FIG. 8 provides a flow diagram of the PSM application in which the application receives a request to transfer the package details for one or more packages to another application according to a particular embodiment. FIG. 9 provides a flow diagram of a data processing application residing in the common carrier's systems 105 configured to process an image of a PSM form for a package received along with corresponding information according to a particular embodiment. Finally, FIG. 10 provides a flow diagram of the data processing application in which the application matches data scanned from the package once the package is received at the carrier's operations with the data acquired from the transmitted image according to a particular embodiment. These two applications are described in greater detail below.

a. PSM Application

As previously discussed, in various embodiments, the wireless computing device 101 may include a PSM application configured to perform various functionality of the claimed invention. FIG. 6 illustrates a flow diagram of the functionality of the PSM application for processing a package for shipment according to various embodiments. This flow diagram may correspond to the steps carried out by the processor 220 of the wireless computing device 101 shown in FIG. 2 as the processor 220 executes the application according to various embodiments.

As previously mentioned, in various embodiments, an individual who plans to ship a package and to make use of this application residing on the individual's wireless computing device 101 fills out a PSM form, affixes the form to the package, and take an image of the form with the camera on the individual's wireless computing device 101. The individual then invokes the PSM application residing on the individual's device 101.

In Step 601, the PSM application receives the image of the PSM form. For instance, in various embodiments, upon invoking the PSM application, the individual selects an option available in the application to ship a package. An initial screen appears asking the individual to select an existing image of the PSM form already available on the individual's wireless computing device 101 or to take an image of the PSM form on the package. In this particular instance, since the individual has already taken an image of the PSM form, the individual selects the image from his available images already saved on the device 101.

In Step 602, the PSM application verifies the image is acceptable for its intended use. In various embodiments, the PSM application performs an analysis on the image to ensure the image is of proper quality to extract information from and to ensure the extracted information is valid. For instance, in one particular embodiment, the PSM application analyzes the image to ensure: (1) the entire PSM form is captured in the image, (2) the carrier tracking number from the PSM form can be extracted from the image bar code and/or tracking number characters and that the tracking number is valid, and (3) the image is of adequate quality and/or completeness of any handwritten information that may have been entered on the PSM form. In some instances, if adequate computing resources are available on the device 101, the PSM application may perform advanced image analysis (e.g., optical character recognition) to conduct automated handwriting recognition and conversion to detailed shipment data elements such as ship-to name and address and selected accessorials, for example. Further, in some embodiments, the PSM application may send the image to the common carrier's systems 105 for verification in addition to or instead of performing the verification itself. This may be the case in instances in which the device's 101 computing resources are inadequate to effectively perform the verification of the image.

Thus, in Step 603, the PSM application determines whether the image is of adequate quality. If not, the PSM application may request the individual to re-take the image of the PSM form on the package, shown as Step 604. Therefore, the individual takes a new image of the PSM form and the application receives the image and verifies whether the new image is acceptable. If the image is acceptable, the PSM application extracts the tracking number from the image, shown as Step 605. For instance, in various embodiments, the PSM application may again employ optical character recognition to read the tracking number off of the PSM form in the image.

In addition, in particular embodiments, the PSM application may inquire whether the individual would like to enter a freeform shipping reference for the package. Such a reference may be useful for the individual when recalling details for the package. For example, the package may contain a birthday present for the individual's niece. In this instance, the individual may enter the freeform shipping reference "Sarah's b-day present." As a result, the individual may use this reference in the future to more easily select and view the shipping details for the package instead of having to recall the carrier's tracking number assigned to the package. Therefore, if the individual enters a shipping reference, the PSM application receives the shipping reference, shown as Step 606. In addition, in various embodiments, the PSM application may be configured so that the individual enter additional information about the package into the application (such as information that may not be able to be read from the image of the form). Thus, the PSM application may also receive such information along with the shipping reference.

Further, in particular embodiments, the PSM application may be configured to allow the individual to identify one or more notifications the individual would like to have sent to the individual or others when particular events occur during shipping of the package. For example, the individual may wish to have a notification sent to the individual and the recipient of the package if the package is delayed during shipping. In certain embodiments, the PSM application may provide a list of available notifications that the individual may select from in a display and the individual may simply check the particular notifications of interest. In addition, the PSM application may request the individual to enter how the individual may wish to have the one or more notifications sent and to enter the necessary information to facilitate sending the notifications. For example, the individual may wish to have a text message notification sent to himself or herself and the recipient of the package if the package is delayed for delivery. Thus, the individual selects the delayed-for-delivery notification option and selects to have the notification sent via text message. In response, the PSM application may request the individual to enter the phone number for the individual and/or recipient so that the message may be sent if need be. Thus, in Step 607, the PSM application receives one or more notification requests if the individual has indicated that he or she would like to have such requests sent.

It should be noted that in some instances, the PSM application and/or common carrier's systems 105 may be able to obtain the information for notifications from other sources. For example, the individual may have registered with the common carrier prior to using the PSM application. During registration, the individual may have indicated his or her preference for receiving notifications. These preferences may include what types of notifications (e.g., delayed delivery notifications) and/or how the individual would like to receive the notifications (e.g., via text message).

In Step 608, the PSM application stores the information for the package locally on the wireless computing device 101. For instance, in one embodiment, the PSM application stores the carrier tracking number, the digital image of the PSM form, any data extracted from the image via image analysis and/or provided by the individual, and the customer reference locally. In addition, in particular embodiments, the PSM application may also obtain the individual's geographical location and store the location along with the information. For example, the PSM application may employ the GPS capabilities of the device 101 and/or triangulation of communications data to obtain the individual's geographical location. In particular embodiments, such information may be useful to the common carrier to help locate where the package was dropped off and/or where the individual is located so that the carrier may pick up the package.

In Step 609, the PSM application transmits the information for the package to the common carrier's systems 105. In particular embodiments, the PSM application may make use of one or more communication channels such as cellular and/or wireless Internet to transmit the information to the carrier's systems 105. Depending on the embodiment, the transmitted information may include the carrier tracking number, the digital image of the PSM form and/or any data extracted from the image and/or provided by the individual, the individual's associated shipping reference for the package, the individual's associated notification requests for the package, an identifier linked to the individual's registration information, or combination thereof. As described in greater detail below, the common carrier processes the transmitted information within the common carrier's systems 105 for use by the common carrier. For example, the common carrier sets up the notification requests within its systems 105 so that such notifications are sent as requested by the individual during shipping of the package. At this point, the individual may drop off the package for shipment. For example, the customer may place the package into the common carrier's "drop box" collection point.

Finally, in Step 610, the PSM application determines whether the individual has another package to ship. If so, the PSM application returns to the step of receiving an image of the PSM form and processes the package as described above. If not, the PSM application exits the shipping option of the application.

In various embodiments, the PSM application provides additional functionality with respect to packages the individual ships with the common carrier. For instance, in particular embodiments, the PSM application allows an individual to view package details for the packages that may also include shipping details received from the common carrier as the packages are shipped with the common carrier. Thus, turning to FIG. 7, the individual may select an option in the PSM application to view details for a package and the PSM application receives the request for this option, shown as Step 701. In Step 702, the PSM application retrieves a list of the packages shipped by the individual. In particular embodiments, the PSM application performs this task by querying the local memory of the device 101 to retrieve a list of the shipped packages that have details saved on the device 101. In other embodiments, the PSM application may also query the common carrier's systems 105 to retrieve any packages shipped by the individual whom details may not have necessarily been saved on the device 101. Thus, in Step 703, the PSM application displays the list of packages on the individual's device 101.

The individual may then review the list of packages and may select one or more of the packages to view the package details. For instance, in one embodiment, the PSM application may provide a list of the available packages by displaying the tracking number and the individual's freeform shipping reference (if available) for each package. The individual may then scroll through the list and select the desired packages. For example, each package may have an associated check box that may be checked if the individual desires to review the details for the package. Once the individual has selected the desired packages, the individual may select a "submit" button on the display. Thus, in Step 704, the PSM application receives the selected packages. Therefore, returning to the example above, the individual selects to view the package details for "Sarah's b-day present" and the PSM application receives the selection of this package.

In response, the PSM application retrieves the detailed information for the selected package, shown as Step 705. For instance, in particular embodiments, the PSM application queries the local memory on the device 101 and retrieves the details saved on the device 101 for the package. In addition, in particular embodiments, the PSM application retrieves any current information from the common carrier. Thus, in these particular embodiments, the PSM application sends a request to the common carrier's systems 105 to return any current information obtained by the common carrier's systems 105 on the package. For example, the common carrier's tracking systems 106 may indicate that the package containing "Sarah's b-day present" was delivered that morning at 9:00 a.m. Therefore, the common carrier's systems 105 return this tracking information to the PSM application so that the PSM application can display the latest tracking information to the individual. In addition, in particular embodiments, the PSM application saves the latest tracking information locally on the device 101, shown as Step 706. As a result, in Step 707, the PSM application displays the package details on the selected package to the individual on the individual's device 101. The individual may then scroll through the information and view that the package had been delivered that morning at 9:00 a.m.

Finally, in Step 708, the individual may select one or more additional packages for viewing. Is so, the PSM application displays the list of available packages to the individual so that the individual may select the one or more additional packages for viewing. If not, the PSM application exits the view package details option of the application.

Further, in particular embodiments, the PSM application also provides functionality to transmit details for one or more packages to another application. For instance, the individual may have shipped a particular package for business purposes and needs to include the details for the package in an expense report so that the individual can be reimbursed for the cost of shipping the package. Thus, turning to FIG. 8, the individual selects the option in the PSM application to transmit the details for the package to another application and the PSM application receives the request for this option, shown as Step 801. Depending on the embodiment, the other application may be an application residing on the individual's wireless computing device or may be an application residing on a remote device such as the individual's laptop computer, for example.

Similar to the option for viewing package details, the PSM application retrieves a list of available packages for transmission, shown as Step 802. Again, the PSM application may compile this list based on the information stored locally on the individual's device 101 and/or by querying the common carrier's systems 105. Thus, the PSM application displays the package listing, shown as Step 803, and the individual selects one or more packages from the displayed list. In addition, the PSM application may also request the individual to identify the "target" application for the transmission. For instance, in one embodiment, the PSM application may provide a listing of compatible applications from which the individual may select an application. While in another embodiment, the PSM application may simply transmit the information by creating one or more files for the selected packages that may be imported into the desired application. For example, the individual's expense report application may be built on Microsoft's Excel® and the PSM application may export the details for the selected package to a CSV file that may be imported into the expense report application. One of ordinary skill in the art can envision various ways to transmit the detailed information for the package to another application in light of this disclosure.

Further, in particular embodiments, the PSM application may allow the individual to select what particular details are to be included in the transmitted information. For instance, in one embodiment, the PSM application may provide a listing of available information for each package and the individual may identify the desired fields from the list. Therefore, returning to the example for exporting the details of the package shipped for business purposes, the individual may select the package tracking number, the shipping reference, the drop off date for the package, the recipient, the ship-to address, the date of delivery, and the shipping cost for the package to be exported to the individual's expense report application.

Thus, in Step 804, the PSM application receives the selection of packages and in some instances, the selection of the "target" application, and desired fields. In response, the PSM application retrieves the package details for the selected packages. Similar to the view-details option described above, in various embodiments, the PSM application may retrieve the details from the local memory of the device 101 as well as from the common carrier's systems 105, shown as Step 805. Upon retrieving the details for the selected packages, the PSM application exports the details, shown as Step 806.

Therefore, returning to the example, the PSM application retrieves the details for the selected package and exports the information for the selected fields into a CSV file. Depending on the embodiment, the CSV file may be created on the individual's local device and/or may be created and transmitted to a remote device over a communication channel such as cellular or wireless Internet. At this point, the individual may import the CSV file into his or her expense report application. As a result, the individual is not required to manually gather the needed information for the package and enter the information into the expense report application. In particular embodiments, such functionality may be very useful if the individual needs to export information for a large number of packages to another application.

Finally, returning to FIG. 8, the PSM application determines whether the export was successful, shown as Step 807. If not, the PSM application may display an error message to the individual, shown as Step 808. In particular embodiments, the error message may provide information as to why the export was unsuccessful. For example, the error message may indicate one or more pieces of information were unavailable, the information is in a format unacceptable by the other application, and/or the communication channel was unavailable. In these instances, the PSM application may ask the individual if he or she would like to re-try the export, shown as Step 809. If so, the PSM application returns to the export step in the process.

b. Data Processing Application

In various embodiments, the common carrier's systems 105 may include one or more servers 104 configured to perform various functionality of the claimed invention. For instance, the carrier's systems 105 may include a server 104 that includes a data processing application 900 for processing the data received from the PSM application as well as other information received for the corresponding packages. FIG. 9 illustrates a flow diagram of the functionality of the data processing application 900 for processing a transmission for a package received from an individual's wireless computing device 101 according to various embodiments. This flow diagram may correspond to the steps carried out by the processor 60 of the server 104 shown in FIG. 3 as the processor 60 executes the application 900 according to various embodiments.

Starting with Step 901, the data processing application 900 receives information transmitted from an individual's wireless computing device 101 on a package being shipped. For instance, in various embodiments, the server 104 on which the application 900 resides may be in communication with the Internet (either directly or indirectly) and the information is received over this communication channel. As previously discussed, the information on the package may include different components according to different embodiments. For instance, in particular embodiments, the information on the package may include the carrier tracking number for the package, the digital image of the PSM form and/or any data extracted from the image, the individual's associated shipment reference for the package, the individual's associated notification request(s) for the package, the individual's geographical location, an identifier linked to the individual's registration information, or combination thereof.

In Step 902, the data processing application 900 routes the notification request(s) to the appropriate systems within the common carrier to be properly processed so that the notification(s) may be sent when appropriate. For instance, in particular embodiments, the common carrier includes one or more notification systems 107 that receive the requests and processes them accordingly. For example, one of the requests received for a particular package may request a notification be sent to the individual by email when the package is delivered. Therefore, in this particular example, the notification systems 107 may implement a trigger in the common carrier's tracking systems 106 to send such an email when the tracking systems 106 receive an indication of delivery of the package (e.g., a driver delivering the package receives a digital signature of the recipient on a handheld device used by the driver). The tracking systems 106 may then retrieve a standard-form email for delivery, information on the delivery from tracking records, and information on the individual (such as the individual's email address) from the individual's registration information and may configured the email accordingly based on the delivery and individual's information. Once the email is completed, the tracking systems 106 may send the email to provide the appropriate notification to the individual that the package has been delivered. In other embodiments, the notification systems 107 may facilitate other mechanisms so that the requested notifications are sent when certain events occur during shipping, such as placing notes on scheduling and/or shipping manifests informing common carrier personnel that such notifications should be sent when these certain events occur during shipping. One of ordinary skill in the art can envision several types of mechanisms the notification systems 107 may employ to implement the notification requests in light of this disclosure.

In addition, in Step 903, the data processing application 900 may route the image of the PSM form to one or more image systems within the common carrier's systems 105 for further data capture according to various embodiments. Thus, in addition to or instead of information being captured from the image on the individual's wireless computing device 101, the image systems may capture further information from the PSM form. For instance, in particular embodiments, the image systems may be employed to capture additional information from the PSM form because the PSM application residing on the individual's wireless computing device 101 is configured to only capture the information initially needed to process the package so that the processing capacity on the device 101 is not over utilized while performing the information capture process. In addition, in particular embodiments, the data processing application 900 may route the image of the PSM form to one or more individuals (e.g., employees of the common carrier) so that the individuals may review the image to ensure the information has been properly captured from the image and/or to enter additional information from the image. Further in particular embodiments, the data processing application 900 may send information extracted or captured from the image back to the PSM application on the individual's wireless computing device 101.

In addition, in Step 904, the data processing application 900 may route information for the package to one or more security systems 108 within the common carrier. For instance, in particular embodiments, the common carrier may include one or more fraud prevention/detection and security evaluation systems 108. Thus, these systems 108 are configured to determine whether the data received for the package indicates the package may be associated with a potentially fraudulent transaction. In addition, these systems 108 are configured to determine whether any security issues may be associated with shipping the package. For example, the systems 108 may compare the information captured from the PSM form with the registration information for the individual to determine whether any inconsistent information may have been entered on the PSM form indicating the package may not have been actually sent by the individual. For example, this may entail the systems 108 checking the individual's address and personal information entered on the form with the address and personal information provided by the individual and stored during registration.

In addition, this may entail the systems 108 checking the individual's unique identifier passed along with the information sent from the individual's wireless computing device 101 with the individual's unique identifier stored along with the individual's registration information. For instance, in one embodiment, the individual is provided with a unique identifier during registration and the individual provides the identifier during the installation process of the PSM application on the individual's device 101. In turn, the unique identifier is stored on the individual's device 101 and sent along with any transmissions sent from the device 101 to the common carrier's systems 105. As a result, the unique identifier may be checked by the common carrier's systems 105 (e.g., the one or more fraud prevention/detection and security evaluation systems 108) to ensure the transmission was actually sent by the individual's device 101.

Further, the fraud prevention/detection and security evaluation systems 108 may check to ensure there is not any security issues associated with shipping the package. These checks may involve reviewing the contents of the package to ensure they are not prohibited from being shipped by the individual through the common carrier (e.g., firearms and/or prescription drugs) and reviewing the parties (e.g., the individual and/or recipient) to ensure they are not prohibited from shipping packages with the common carrier.

Finally, in Step 905, the data processing application 900 may route information for the package to various carrier systems 105 that may make use of such information so that the package may be properly processed and shipped with the common carrier according to various embodiments. For instance, the application 900 may route portions of the information to the common carrier's tracking systems 106 so that the tracking systems 106 may make use of the information during shipping, such as the recipient's address and any special instructions associated with the package such as the contents of the package being temperature sensitive.

At this point, the common carrier may take possession of the package from the individual for shipping. Thus, the common carrier receives the package and returns to the carrier's local operating facility or "origin" center. In particular embodiments, this facility may be a processing center in which packages are processed and sorted so that they may be placed in the correct distribution channels within the common carrier's network. Thus, the package is received at the "origin" center and the bar code on the PSM form attached to the package is scanned. As a result of scanning the bar code, certain data (e.g., information) may be read into the common carrier's systems 105 from the PSM form as well as certain data may be generated within the common carrier's systems 105 (such as a record indicating the package has been received at the "origin" center).

In particular embodiments, the scanned data may be routed to the data processing application 900. Accordingly, FIG. 10 illustrates a flow diagram of the functionality of the data processing application 900 for processing the scanned data according to various embodiments. Thus, in these particular embodiments, the data processing application 900 receives the scanned data, shown as Step 1001. In Step 1002, the data processing application 900 matches the data received from the scan once the package arrives at the "origin" center with the information sent from the individual's wireless computing device 101. Thus, the data processing application 900 may make use of one or more pieces of information from the scanned data to match with the information received from the device 101 and captured from the image of the PSM form. For example, the data process application 900 may match the scanned data and stored information via the carrier's tracking number and/or package identifier associated with the package.

In addition, in Step 1003, the data processing application 900 may determine whether a match was found and whether all of the needed information from the PSM form has been captured in various embodiments. If all of the needed information has not been captured, the data processing application 900 may route/divert the associated PSM image and/or package with an affixed PSM form/label to one or more areas and/or systems 105 within the common carrier so that the required data may be captured from the image and/or form/label. Similar to processing the transmission received from the individual's wireless computing device 101, the systems 105 may capture the required data automatically and/or by having the data entered by one or more individuals. In addition, in Step 1004, the data processing application 900 may also route the captured data to one or more security systems 108 within the common carrier, shown as Step

1005. Again, similar to processing the transmission received from the individual's wireless computing device 101, this particular step in the processing may involve routing the data to one or more fraud prevention/detection and security evaluation systems 108. Finally, in Step 1006, the data processing application may provide information from the captured data (and information captured from the scanned data) to various carrier systems 105 that may make use of such information so that the package may be properly processed and shipped with the common carrier according to various embodiments.

V. Benefits

Thus, the entire process for shipping a package using various aspects of this invention according to different embodiments may provide convenience for individuals (e.g., customers) who prepare and ship packages with common carriers with automated capture of tracking numbers for the packages. In addition, such embodiments may provide automated capture of shipment details, including ship-from and ship-to addresses, selected accessorials, billing methods, and notification requests and provide a mechanism for individuals to conveniently label packages/shipments with the individual's own reference data. Further, such embodiments may store tracking numbers and related data for various packages shipped with the common carrier to a local data store, from which applications can obtain, current status information for a particular package/shipment, obtain electronic data regarding shipment details such as ship-to address, ship date, scheduled delivery date, weight, service level, and accessorials, and transmit information for particular packages/shipments to other applications, such as applications that document or manage the individuals' activities and/or expenses.

In addition, various embodiments of the invention may also provide an earlier opportunity for common carriers to capture shipment data for packages, by capturing a digital image of the shipping form for a particular package (e.g., the PSM form) and transmitting the image to the carrier's systems 105. In particular embodiments, such transmissions may often facilitate capture of data on the packages hours earlier than in current processes typically found in the industry which do not begin data capture until after the carrier has picked up packages and has returned to a local operating center.

V. Conclusion

Many modifications and other embodiments of the inventions set forth herein will come to mind to one skilled in the art to which these embodiments of the invention pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A system comprising a wireless computing device configured to:
   (a) detect, using a multimedia capturing device of the wireless computing device, a tracking number for shipping a package;
   (b) provide a detected location of the wireless computing device of a user to a communication device of the common carrier; and
   (c) transmit the tracking number, in response to determining that the tracking number is valid, to the communication device of the common carrier prior to the common carrier taking possession of the package and indicating a pickup of the package is requested, at a collection point location, of the common carrier, in which the user drops off the package for pickup, the collection point determined based in part on the detected location, to enable one or more systems of the common carrier to process information extracted from the tracking number to facilitate shipping the package with the common carrier.

2. The system of claim 1, wherein the wireless computing device is further configured to:
   receive one or more notification requests from a user of the wireless computing device, each notification request comprising a request to send a status notification to one or more individuals when a particular event occurs with respect to the package during shipping with the common carrier; and
   transmit the one or more notification requests to the common carrier so that the one or more systems of the common carrier can perform sending a status notification in response to each notification request after the particular event associated with the notification request is shown to have occurred in carrier information obtained by the common carrier during shipping of the package.

3. The system of claim 1, wherein as a result of the transmission of the tracking number, the one or more systems of the common carrier can also perform (1) extracting information from the tracking number and (2) linking one or more of the tracking number, or the extracted information to carrier information obtained by the common carrier during shipping of the package.

4. The system of claim 1, wherein the wireless computing device is further configured to:
   receive a unique shipping reference for the package entered by the user of the wireless computing device; and
   transmit the unique shipping reference to the common carrier so that the common carrier can use the unique shipping reference as a mechanism for individuals to identify the package for the common carrier.

5. The system of claim 1, wherein the wireless computing device comprises memory and is further configured to store the tracking number, and extracted information from the tracking number on the wireless computing device so that at least one of the tracking number, or the extracted information can be retrieved from the memory and displayed on the wireless computing device.

6. The system of claim 5, wherein the wireless computing device is further configured to:
   store the location of the wireless computing device in the memory along with the tracking number.

7. The system of claim 1, wherein the wireless computing device is further configured to:
   receive carrier information from the common carrier, the carrier information comprising current tracking information on one or more particular events that have occurred during shipping of the package; and
   display the carrier information on the wireless computing device for viewing.

8. The system of claim 7, wherein the carrier information further comprises a fee charged by the common carrier for shipping the package.

9. The system of claim 7, wherein the wireless computing device comprises memory and is further configured to:
store the carrier information in the memory so that the carrier information can be retrieved from the memory and displayed on the wireless computing device.

10. The system of claim 7, wherein the wireless computing device is further configured to:
retrieve information on the package comprising one or more of the tracking number, or the carrier information; and
transfer the retrieved information to one or more files or another application residing on the wireless computing device.

11. The system of claim 1, wherein the wireless computing device is further configured to:
extract information from the tracking number; and
display the extracted information on the wireless computing device for viewing.

12. The system of claim 1, wherein the transmission to the common carrier also comprises an identifier for an individual shipping the package so that the common carrier can identify: (1) the individual from the identifier and (2) an account the individual has with the common carrier.

13. The system of claim 12, wherein the common carrier can charge a fee to the account for the individual for shipping the package.

14. The system of claim 1, wherein the wireless computing device is further configured to:
extract the tracking number by extracting the tracking number from a bar code or one or more tracking number characters from the image.

15. A non-transitory computer-readable medium comprising executable code, that when executed by at least one processor of a wireless computing device causes the wireless computing device to:
(a) detect, using a multimedia capturing device of the wireless computing device, a tracking number for shipping a package;
(b) provide a detected location of the wireless computing device of a user to a communication device of the common carrier; and
(c) transmit the tracking number, in response to determining that the tracking number is valid, to the communication device of the common carrier prior to the common carrier taking possession of the package and indicating a pickup of the package is requested, at a collection point location, of the common carrier, in which the user drops off the package for pickup, the collection point determined based in part on the detected location, to enable one or more systems of the common carrier to process information extracted from the tracking number to facilitate shipping the package with the common carrier.

16. The non-transitory computer-readable medium of claim 15, wherein when the executable code is executed by the at least one processor of the wireless computing device causes the wireless computing device to:
receive one or more notification requests from a user of the wireless computing device, each notification request comprising a request to send a status notification to one or more individuals when a particular event occurs with respect to the package during shipping with the common carrier; and
transmit the one or more notification requests to the common carrier so that the one or more systems of the common carrier can perform sending a status notification in response to each notification request after the particular event associated with the notification request is shown to have occurred in carrier information obtained by the common carrier during shipping of the package.

17. The non-transitory computer-readable medium of claim 15, wherein the verification of the image involves: (1) determining the entire shipping form has been captured in the image; (2) determining the quality of the image is acceptable; and (3) verifying completeness of information provided on the shipping form.

18. The non-transitory computer-readable medium of claim 15, wherein as a result of the transmission of the tracking number, the one or more systems of the common carrier can also perform (1) extracting information from the tracking number and (2) linking one or more of the tracking number, or the extracted information to carrier information obtained by the common carrier during shipping of the package.

19. The non-transitory computer-readable medium of claim 15, wherein when the executable code is executed by the at least one processor of the wireless computing device causes the wireless computing device to:
receive a unique shipping reference for the package entered by the user of the wireless computing device; and
transmit the unique shipping reference to the common carrier so that the common carrier can use the unique shipping reference as a mechanism for individuals to identify the package for the common carrier.

20. The non-transitory computer-readable medium of claim 15, wherein when the executable code is executed by the at least one processor of the wireless computing device causes the wireless computing device to:
store the image, the tracking number, and information extracted from the image in memory residing in the wireless computing device so that at least one of the image, the tracking number, or the information extracted from the image can be retrieved from the memory and displayed on the wireless computing device.

21. The non-transitory computer-readable medium of claim 20, wherein when the executable code is executed by the at least one processor of the wireless computing device causes the wireless computing device to:
capture the location of the device and store the location in the memory along with the tracking number.

22. The non-transitory computer-readable medium of claim 15, wherein when the executable code is executed by the at least one processor of the wireless computing device causes the wireless computing device to:
receive carrier information from the common carrier, the carrier information comprising current tracking information on one or more particular events that have occurred during shipping of the package; and
display the carrier information on the wireless computing device for viewing.

23. The non-transitory computer-readable medium of claim 22, wherein the carrier information further comprises a fee charged by the common carrier for shipping the package.

24. The non-transitory computer-readable medium of claim 22, wherein when the executable code is executed by the at least one processor of the wireless computing device causes the wireless computing device to:

store the carrier information in memory residing in the wireless computing device so that the carrier information can be retrieved from the memory and displayed on the wireless computing device.

25. The non-transitory computer-readable medium of claim 22, wherein when the executable code is executed by the at least one processor of the wireless computing device causes the wireless computing device to:

retrieve information on the package comprising one or more of the image, the tracking number, or the carrier information; and transfer the retrieved information to one or more files or another application residing on the wireless computing device.

26. The non-transitory computer-readable medium of claim 15, wherein when the executable code is executed by the at least one processor of the wireless computing device causes the wireless computing device to:

extract information from the image; and display the extracted information on the wireless computing device for viewing.

27. The non-transitory computer-readable medium of claim 15, wherein the transmission to the common carrier also comprises an identifier for an individual shipping the package so that the common carrier can identify: (1) the individual from the identifier and (2) an account the individual has with the common carrier.

28. The non-transitory computer-readable medium of claim 27, wherein the common carrier can charge a fee to the account for the individual for shipping the package.

29. The non-transitory computer readable medium of claim 15, wherein when the executable code is executed by the at least one processor of the wireless computing device causes the wireless computing device to:

extract the tracking number by extracting the tracking number from a bar code or one or more tracking number characters from the image.

30. A method comprising:

providing executable code installed on a wireless computing device, wherein when the executable code is executed by at least one processor of the wireless computing device causes the wireless computing device to:

(a) verify whether a captured image of a shipping form useable with a package is suitable for analysis and transmission detect, using a multimedia capturing device of the wireless computing device, a tracking number for shipping a package;

(b) provide a detected location of the wireless computing device to a communication device of the common carrier; and (c) transmit the tracking number, in response to determining that the tracking number is valid, to the communication device of the common carrier prior to the common carrier taking possession of the package and indicating a pickup of the package is requested, at a collection point location, of the common carrier, in which the user drops off the package for pickup, the collection point determined based in part on the detected location to enable one or more systems of the common carrier to process information extracted from the tracking number to facilitate shipping the package with the common carrier.

31. The method of claim 30, wherein when the executable code is executed by the at least one processor of the wireless computing device causes the wireless computing device to:

receive one or more notification requests from a user of the wireless computing device, each notification request comprising a request to send a status notification to one or more individuals when a particular event occurs with respect to the package during shipping with the common carrier; and transmit the one or more notification requests to the common carrier so that the one or more systems of the common carrier can perform sending a status notification in response to each notification request after the particular event associated with the notification request is shown to have occurred in carrier information obtained by the common carrier during shipping of the package.

32. The method of claim 30, wherein when the executable code is executed by the at least one processor of the wireless computing device causes the wireless computing device to:

extract the tracking number by extracting the tracking number from a bar code or one or more tracking number characters detected by the multimedia capturing device of the wireless computing device.

\* \* \* \* \*